United States Patent [19]
Kikuchi

[11] Patent Number: 5,526,066
[45] Date of Patent: Jun. 11, 1996

[54] PICTURE DISPLAY DEVICE

[75] Inventor: Toshihiro Kikuchi, Saitama, Japan

[73] Assignee: Sony Corporation, Tokyo, Japan

[21] Appl. No.: 943,227

[22] Filed: Sep. 10, 1992

[30] Foreign Application Priority Data

Sep. 20, 1991 [JP] Japan ................................ 3-270244

[51] Int. Cl.⁶ ...................................... H04N 5/65
[52] U.S. Cl. ...................................... 348/841.000
[58] Field of Search ................................ 348/836, 841, 348/844

[56] References Cited

U.S. PATENT DOCUMENTS

| | | | |
|---|---|---|---|
| 4,935,819 | 6/1990 | Pederson | 358/254 |
| 4,951,149 | 8/1990 | Faroudja | 348/841 |
| 5,343,257 | 8/1994 | Kohno et al. | 348/841 |

FOREIGN PATENT DOCUMENTS

| | | |
|---|---|---|
| 2104073 | 4/1990 | Japan . |
| 2179085 | 7/1990 | Japan . |
| 2189085 | 7/1990 | Japan . |

*Primary Examiner*—Bentsu Ro
*Attorney, Agent, or Firm*—Ronald P. Kananen

[57] ABSTRACT

A picture display device which displays either of two pictures having different aspect ratios on the same screen thereof includes two screening units and a filter member which is disposed ahead of the screening units. Each screening unit has a rotatable reel and a screening sheet which is wound around the reel. The screening sheet is movable by the rotation of the reel so as to fully expose a screen of the picture display device and to screen a remaining or no-signal portion of the screen.

10 Claims, 5 Drawing Sheets

PICTURE DISPLAY DEVICE

BACKGROUND OF THE INVENTION

1. Field of the Invention

The present invention relates in general to a picture display device such as a television receiver, and more particularly to a picture display device which displays either of two pictures having different aspect ratios on the same screen thereof.

2. Description of the Prior Art

A standard television receiver displays on a screen thereof a picture of which aspect ratio is 4 to 3. On the other hand, a high definition television receiver displays on a screen thereof a picture of which aspect ratio is 16 to 9. That is, the ratio of horizontal width of the picture to vertical height thereof in television is 16:9.

Thus, as is seen from FIG. 9, in case that a high definition picture having the aspect ratio of 16:9 is displayed on a standard television screen having the aspect ratio of 4:3, there are produced two remaining portions or no-signal portions 10 on the upper and lower end portions of the screen. Thus, the remaining portions 10 have no picture thereon.

On the other hand as is seen from FIG. 8, in case that a standard picture having the aspect ratio of 4:3 is displayed on a high definition television screen having the aspect ratio of 16:9, there are produced two remaining portions 12 on the two side portions of the screen.

As is mentioned hereinabove, the remaining portions are produced by the difference between the aspect ratio of the picture and that of the screen. The remaining portions make the screen unsightly when the picture is displayed on the screen.

In view of this, there are proposed display devices, for example, Japanese Patent First Publications Hei-2-104073, Hei-2-179085 and Hei-2-189085, each of which is equipped with two movable screening members to cover or screen the remaining portions of the television screen. However, these conventional display devices equipped with the movable screening members have the following drawbacks.

The movable screening members which are mounted on a front portion of a TV housing are exposed and thus within a TV viewer's reach. Therefore, the movable screening members are necessarily made of plastic or the like which is high in rigidity so as not to be damaged even if the TV viewer adds a substantially large force to the movable screening members. Furthermore, the television receiver is to be necessarily equipped with a safety device to automatically stop the movement of the screening members when the TV viewer touches the screening members by mistake. Thus, the structure of a drive unit to move the screening members complicated due to the installation of the safety device thereon.

The above-mentioned conventional screening members are platelike in shaped slidable in a vertical or horizontal direction so as to move from a first position in which the TV screen is fully exposed to a second position in which the remaining portions of the TV screen are screened thereby. Thus, o a relatively large space must be provided for the sliding movement of the screening members. This tends to impede the development or of a compact TV set.

SUMMARY OF THE INVENTION

It is therefore an object of the present invention to provide an improved picture display device in which a safety device to automatically stop the movement of screening members can be omitted.

It is another object of the present invention to provide a picture display device of which screening members can be received in a relatively small space.

It is still another object of the present invention to provide a picture display device of which screening members are not within a TV viewer's reach.

According to the present invention, there is provided a picture display device which is capable of displaying either of first and second pictures having first and second aspect ratios respectively on a screen thereof, the screen having the first aspect ratio, the device comprising: a housing; a filter member for covering the screen, the filter member being connected to the housing; and a screening unit for screening a remaining portion of the screen, the remaining portion being produced when the second picture is displayed on the screen, the screening unit including: a reel which is rotatably connected to the housing; a screening sheet which is wound around the reel; and drive means to rotate the reel in a certain direction so as to move the screening sheet, from a first position in which the screen is fully exposed so as to display the first picture thereon, to a second position in which the remaining portion is screened by the screening sheet, the filter member being positioned so as to cover the screening unit.

DESCRIPTION OF THE PREFERRED EMBODIMENTS

Referring to FIGS. 1 to 6, there is provided a direct viewing type high definition television receiver (DV-HDTV)

which is equipped with two screening units according to the present invention.

Figure 1:
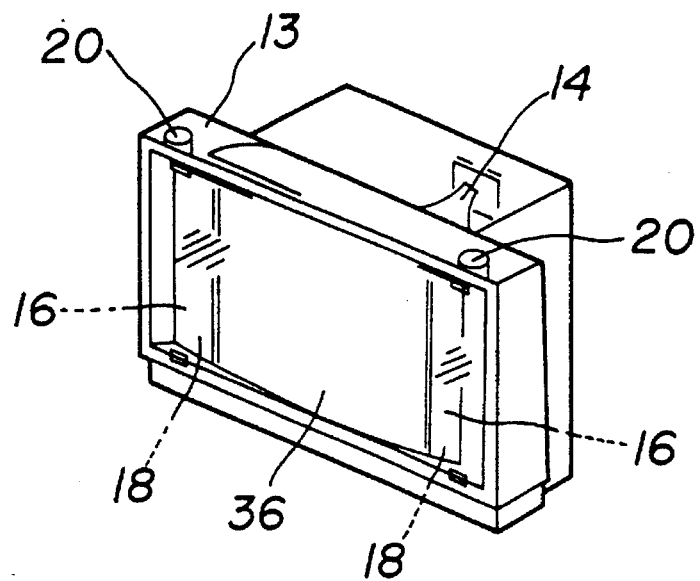
FIG. 1 is a perspective view of a high definition television receiver which is equipped with two screening units according to the present invention.

As is seen from FIG. 1, DV-HDTV has a direct viewing tube 14 disposed in a housing 13 thereof. The direct viewing tube 14 has a screen of which aspect ratio is 16:9. Therefore, a high definition picture of which aspect ratio is 16:9 can be displayed on the screen without having a remaining or no-signal portion thereon.

When a standard picture of which aspect ratio is 4:3 is displayed on the screen of DV-HDTV, there are inevitably produced the remaining portions 16 on two side portions of the screen.

Accordingly, in accordance with the present invention, the screening units are provided so as to screen the remaining portions 16 upon displaying the standard picture. Since the two screening units are identical in construction, only one screen unit will be described in the following.

Figure 4:
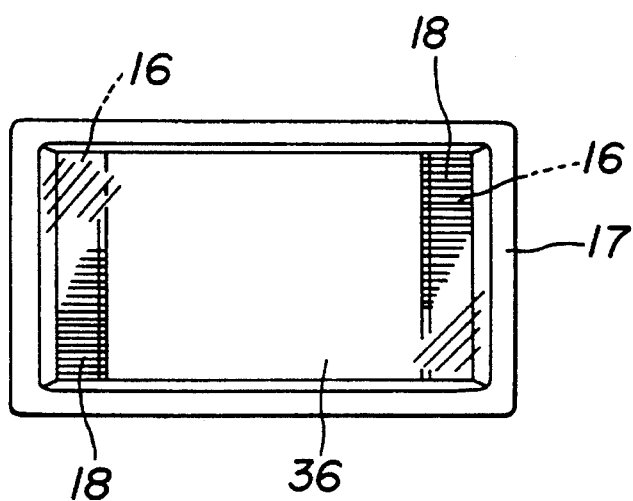
FIG. 4 is a front elevational view of the high definition television receiver which is equipped with a front frame on which the screening units are mounted.
Figure 5:
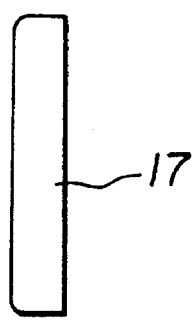
FIG. 5 is a side elevational view of the front frame; showing the front frame on which the screening unit is to be

As is seen from FIGS. 4 and 5, each screening unit is mounted on a front frame 17. The front frame 17 is rectangular in shape and detachably mounted on a front portion of the housing 13.

Figure 2:
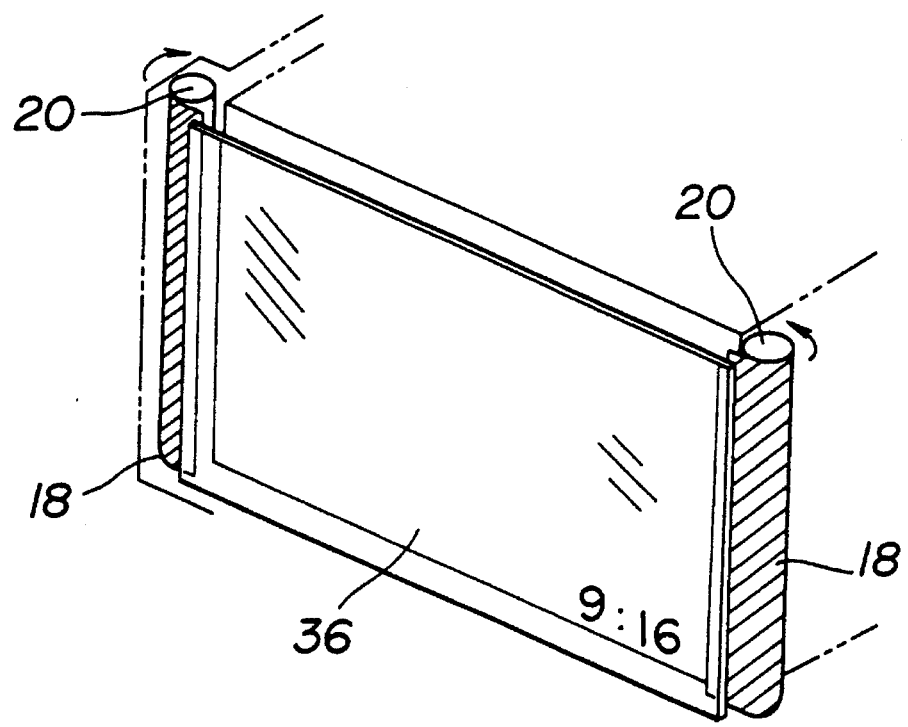
FIG. 2 is a perspective and schematic view of a front portion of the high definition television receiver, showing a condition in which two movable screening sheets are respectively fully wound around reels.
Figure 3:
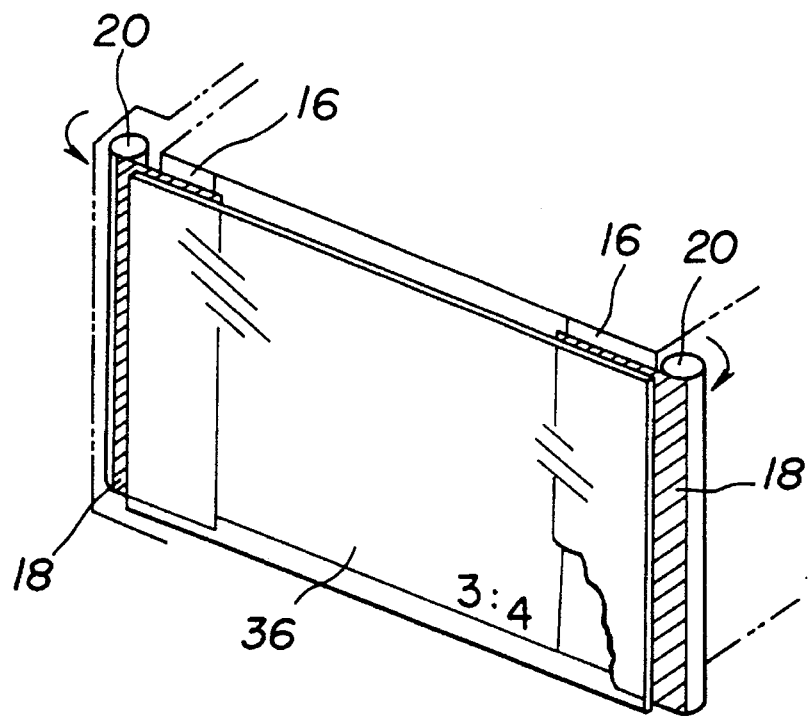
FIG. 3 is a view similar to FIG. 2, but showing a condition in which the movable screening sheets are unwound from the reels so as to screen two side retaining portions of a screen of the high definition television receiver.

As is seen from FIGS. 2 and 3, each screening unit has a screening sheet 18 which is a plastic sheet or the like. The screening sheet 18 is wound around a reel 20 which is rotatably mounted on the front frame 17. The screening sheet 18 is horizontally movable by the rotation of the reel 20, from a first position in which the screening sheet 18 is substantially fully wound around the reel 20 so as to fully expose the screen (see FIG. 2), to a second position in which the screening sheet 18 is unwound from the reel 20 so as to screen the remaining portion 16 of the screen (see FIG 3).

Figure 6:
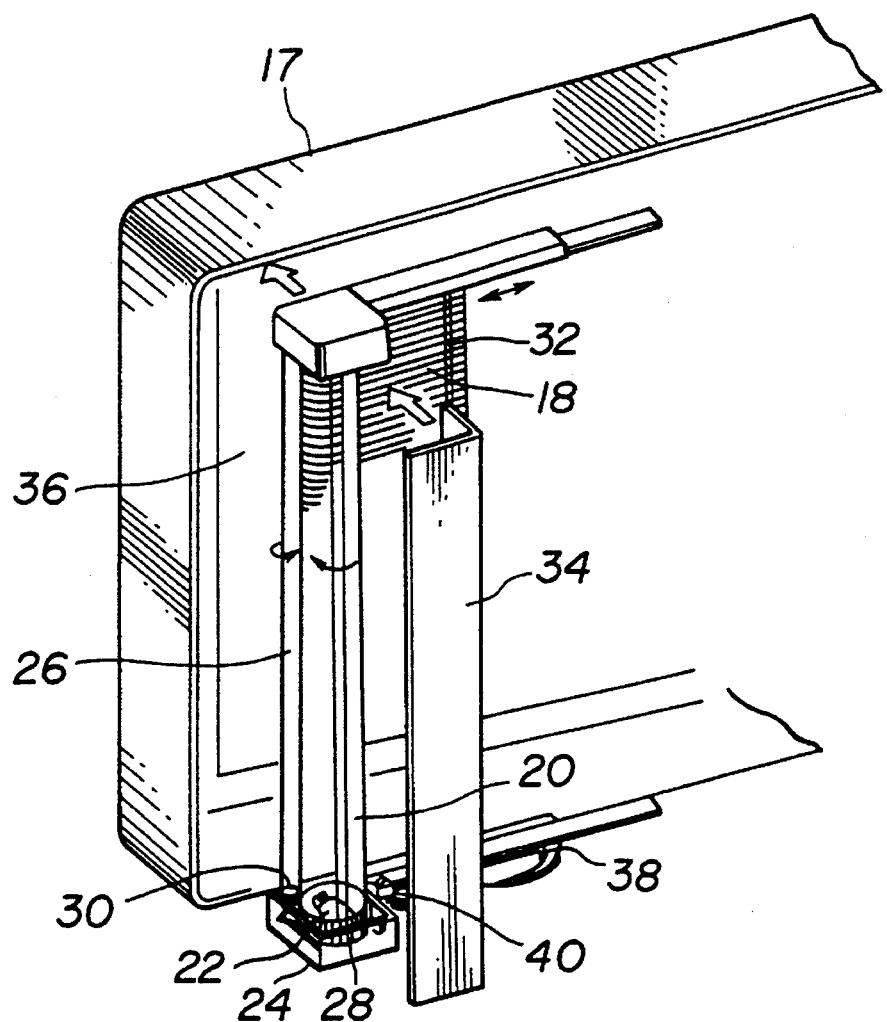
FIG. 6 is an enlarged rear perspective and exploded view, mounted.

As is seen from FIG. 6, the reel 20 is rotated by a DC motor 22 which is received in a case 24. The screening unit has a pinch roller 26 which is rotatable with the reel 20 in an interlocking manner through gears 28 and 30. The pinch roller 26 is so positioned away from the reel 20 such that the screening sheet 18 is interposed between the pinch roller 26 and the reel 20. Furthermore, the pinch roller 26 is so arranged by the gears 28 and 30 such that the pinch roller 26 is rotated in a direction opposite to that of the reel 20, as is shown by arrows of FIG. 6. Therefore, the screening sheet 18 is smoothly wound around the reel 20 and unwound therefrom. The screening sheet 18 has a leading edge which is vertically defined and reinforced by a reinforcing member 32 so as to have a certain shape upon winding and unwinding the screening sheet 18. The reel 20 is covered by a protective cover 34.

Figure 7:
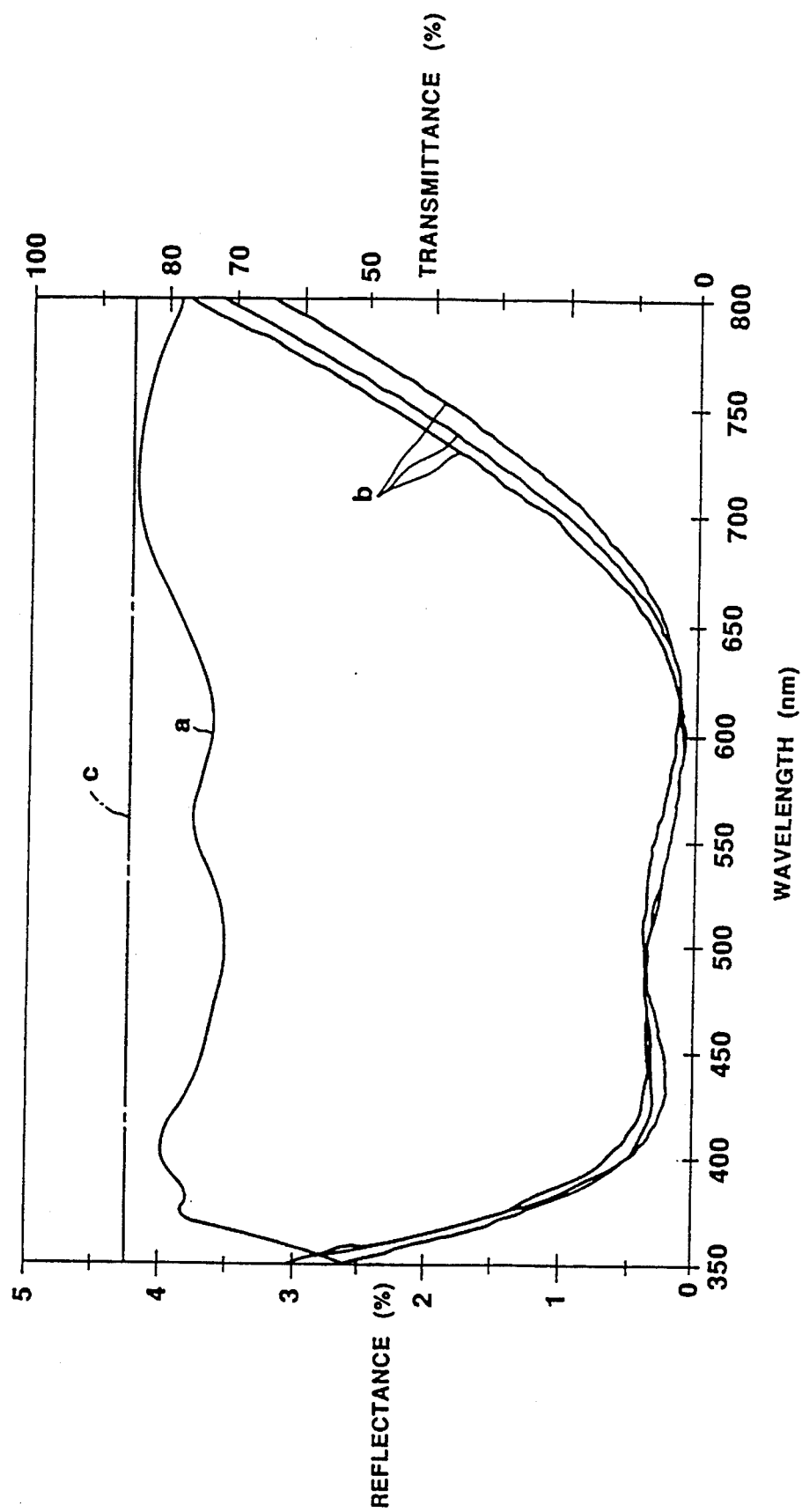
FIG. 7 is a graph in which reflectance of a filter member of the present invention as a function of wavelength solid line (a) and in which transmittances of the filter member and a conventional untreated filter member as a function of wavelength are respectively shown by solid lines (b) and a chain line (c)

Designated by numeral 36 is a filter member which also serves as a protective cover of the screen. The filter member 36 is disposed ahead of the screening sheets 18 and mounted on a front end surface of the front frame 17, such that the screening units can not be touched by a TV viewer by mistake. The filter member 36 is made of a transparent glass plate or a transparent plastic plate or the like a predetermined thickness, for example, 3 mm. The filter member 36 is reinforced and treated so as to have a high transmittance and a low reflectance substantially throughout tile visible portion of the spectrum, as is shown in FIG. 7. Thus, undesirable reflectance of the outside light can be suppressed by the filter member 36.

Operation of the screening unit according to the present invention will be describe in the following.

The description will be commenced on the assumption that the screening sheet 18 takes the above-mentioned first position in which it is substantially wound around the reel 20. Under this condition, the screen of which aspect ratio is 16:9 is fully exposed so as to display the high definition picture thereon.

When the standard picture is to be displayed on the screen, the reel 20 is rotated by the DC motor 22 so as to unwind the screening sheet 18 arid to screen the remaining portion 16 of the screen by the same. When the screening sheet 18 is moved to the above-mentioned second position in which the remaining portion 16 is fully screened by the screening sheet 18, the position of a leading edge of the screening sheet is detected by a first position sensing leaf switch 38 so as to stop the movement of the DC motor 22 and the reel 20.

Figure 8:
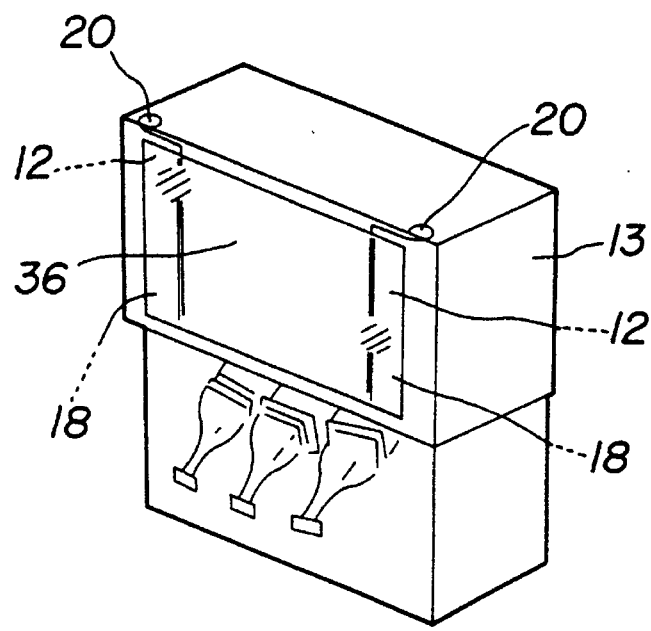
FIG. 8 is a perspective view of a rear projector-type high definition television receiver which is equipped with two screening units according to the present invention.

When the high definition picture is to be displayed again on the screen, the reel 20 is rotated by the DC motor 22 so as to wind the screening sheet 18 around the reel 20 and to fully expose the screen. When the screening sheet 18 is moved to the first position, the position of the leading edge of the screening sheet 18 is detected by a second position sensing leaf switch 40 so as to stop the movement of the DC motor 22 and the screening sheet Referring to FIG. 8, there is provided a rear projector type high definition television receiver (RP-HDTV) which is equipped s with the two screening units according to the present invention. The screening units are disposed beside two side end portions of a screen of RP-HDTV, and have screening sheets 18 which are horizontally movable. RP-HDTV has a filter member 36 which is disposed ahead of the screening units.

Figure 9:
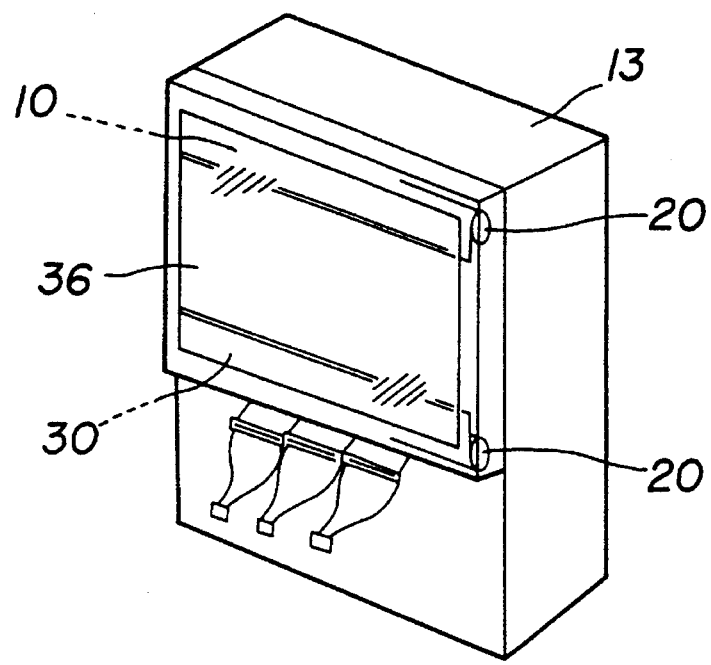
FIG. 9 is a perspective view of a rear-projector type standard television receiver which is equipped with two screening units according to the present invention.

Referring to FIG. 9, there is provided a rear projector type standard television receiver (RP-SDTV) which is equipped with the two screening units according to the present invention. The screening units are disposed next to upper and lower end portions of a screen of RP-SDTV, and have screening sheets 18 which are vertically movable. RP-SDTV has a filter member 36 which is disposed ahead of the screening units.

Advantages of the picture display device according to the present invention will be described in the following.

Since the picture display device has the filter member 36 which is disposed ahead, ad of the screening units, the screening s units can not be touched by a TV viewer by mistake. Therefore, a safety device to automatically stop the movement of the screening sheets can be omitted, and thus the structure of the screening units can be simplified.

When the screening sheet is not used for screening the remaining portion of the screen, it is substantially fully wound around the reel. Thus, it takes a relatively small space.

What is claimed is:

1. A picture display device which is capable of displaying either of first and second pictures having first and second aspect ratios respectively on a screen thereof, the screen having the first aspect ratio, said device comprising:

a housing;

a filter member for covering the screen, said filter member being connected to said housing; and a screening unit for screening a remaining portion of the screen, the remaining portion being produced when the second picture is displayed on the screen, said screening unit including:

a reel which is rotatably, connected to said housing;

a screening sheet which is wound around said reel; and drive means to rotate said reel in a certain direction so as to move said screening sheet, from a first position in which the screen is fully exposed so as to display the first picture thereon, to a second position in which the remaining portion is screened by said screening sheet, said filter member being positioned so as to cover said screening unit.

2. A picture display device according to claim 1, wherein said drive means comprises a DC motor.

3. A picture display according to claim 1, wherein said screening unit further comprises a pinch roller which is positioned away from said reel such that said screening sheet is interposed between the pinch roller and said reel, and wherein the pinch roller is so arranged as to rotate in an interlocking manner in a direction which is opposite to that of the rotation of said reel, thereby smoothly moving said screening sheet.

4. A picture display device according to claim 1, wherein said screening unit further comprises a first switch for stopping the rotation of said reel when said screening sheet takes the second position and a second switch for stopping the rotation of said reel when said screening sheet takes the first position.

5. A picture display device according to claim 1, wherein said screening unit is mounted in a frame which is detachably mounted on said housing.

6. A covering device for covering a nonilluminated portion a TV picture tube, said covering device comprising:

a housing;

a filter member for covering a screen of the picture tube, said filter member being connected to said housing; and a screening unit for screening a nonilluminated portion of the screen, the nonilluminated portion being produced when a partial-screen picture is displayed on the screen, said screening unit including:

a reel which is rotatably connected to said housing;

a screening sheet which is wound around said reel; and drive means to rotate said reel in a certain direction so as to move said screening sheet, from a first position in which the screen is fully exposed so as to display a full-screen picture thereon;

to a second position in which the nonilluminated portion is screened by said screening sheet, said filter member being positioned so as to cover said screening unit.

7. A covering device according to claim 6, wherein said drive means comprises a DC motor.

8. A covering device according to claim 6, wherein said screening unit further comprises a pinch roller which is positioned away from said reel such that said screening sheet is interposed between the pinch roller and said reel, and wherein the pinch roller is so arranged as to rotate in an interlocking manner in a direction which is opposite to that of the rotation of said reel, thereby smoothly moving said screening sheet.

9. A covering device according to claim 6, wherein said screening unit further comprises a first switch for stopping the rotation of said reel when said screening sheet takes the second position and a second switch for stopping the rotation of said reel when said screening sheet takes the first position.

10. A covering device according to claim 6, wherein said screening unit is mounted on a frame which is detachably mounted on said housing.

* * * * *